[12] United States Patent  
Miller, III et al.

(10) Patent No.: US 7,383,440 B1
(45) Date of Patent: Jun. 3, 2008

(54) PRIVATE USER CONTROL OF A SHARED REMOTE PROCESS

(75) Inventors: Charles Edward Miller, III, Auberry, CA (US); Albert K Boyden, III, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 752 days.

(21) Appl. No.: 10/837,422

(22) Filed: Apr. 30, 2004

Related U.S. Application Data (60) Provisional application No. 60/467,403, filed on May 1, 2003.

(51) Int. Cl.
*H04L 9/00* (2006.01)
*G06F 15/16* (2006.01)
(52) U.S. Cl. ..................... 713/171; 709/217
(58) Field of Classification Search .............. None
See application file for complete search history.

(56) References Cited

U.S. PATENT DOCUMENTS 6,895,502 B1 * 5/2005 Fraser .................. 713/168
7,003,667 B1 * 2/2006 Slick et al. ............ 713/182

* cited by examiner

*Primary Examiner*—Nasser Moazzami
*Assistant Examiner*—Brandon S Hoffman
(74) *Attorney, Agent, or Firm*—McDermott Will & Emery LLP (57) ABSTRACT

A user host device privately controls a shared remote process that executes in a remote device, in which respective public keys between the user host device and the shared remote process are exchanged through an intermediary device, the user host device validates the process public key based on current and previous nonce values, and sends to the remote process a double-encrypted process command, and the remote process double-decrypts the process command, executes the process command, and then returns a double-encrypted response to the user host device which decrypts and validates the response. Trust between the user host device and the remote process is established by the user host device verifying a remote process response, and the trust is maintained by chaining each session nonce with the previous session nonce, without the knowledge of the intermediary process host device.

26 Claims, 5 Drawing Sheets

PRIVATE USER CONTROL OF A SHARED REMOTE PROCESS

CROSS-REFERENCES AND RELATED APPLICATIONS

This application claims priority to U.S. Provisional Application No. 60/467,403, filed on May 1, 2003, and entitled "METHOD FOR INTERFACING WITH A REMOTE SHARED PROCESS PRIVATELY BY INDIVIDUAL USERS WITHOUT SHARING PRIVACY WITH A CERTIFICATE AUTHORITY", which is herein incorporated by reference in its entirety for all purposes.

STATEMENT AS TO RIGHTS TO INVENTIONS MADE UNDER FEDERALLY SPONSORED RESEARCH OR DEVELOPMENT

Not applicable to this invention.

BACKGROUND OF THE INVENTION

1. Field of the Invention

The present invention concerns a method and system for establishing private control by a user host device of a shared remote process executing in a remote device, through a communication link between the user host device and the remote device via an intermediary communication device. The private control is established so that the user host device can send commands to the shared remote process without the intermediary communication device having knowledge of the commands.

2. Description of the Related Art

In networked computing environments, it is common for a user of a first computing device to control a shared process executing on a remote second computing device. In many cases, the communication link between the first computing device and the second computing device for controlling the shared remote process must pass through one or more other computing devices, such as a common controller which owns, and controls access to, the remote shared process. In such cases, it may be desirable for the user of the first device to maintain privacy of the control session with the shared remote process by preventing the other computing devices from having visibility of the commands to the remote process, and of the responses from the remote process.

There are many instances where the process owner (controller) needs to grant access and specific control of a particular remote shared process to a remote user. In this context, the process host grants or denies access, and has visibility into, the communications between the user and the shared process, and the results from the shared process to the user. The aerospace industry is one example of such a situation. In particular, a remote process may be executing in a satellite, and it may be desirable for the remote process to be under the control of a user who is external to the satellite command and control infrastructure (the satellite host). Historically, in such a situation, the remote user supplies control information to the satellite host for execution and trusts the satellite host (command and control infrastructure) to return correct and accurate response information.

The foregoing method is unsatisfactory for a class of remote satellite users who insist on being segregated from the process host (satellite command and control authority), both from a process control privacy perspective, and also from a process results trust perspective. In other words, the remote user does not want the satellite host to have visibility of the control commands to the shared remote process executing in the satellite, and the remote user does not want the satellite host to have visibility of the results returned from the remote process in response to the user's commands. The problem is further exacerbated by the need of multiple users to be private from one another and to access the shared remote process simultaneously.

One specific example of this problem in the aerospace industry is the need to allow a remote user to direct a communications beam onto a specific target on the earth from a satellite in geosynchronous orbit, wherein the direction of the beam is private from the satellite control facilities and only known by the remote user, the remote process and the target. While this represents an example of one such problem, the need for remote private process control has wider application, both in the aerospace industry and in other industries where private control of a remote shared process is desired.

Known approaches to the aforementioned satellite communications beam control problem include having the satellite collect data for the entire hemispherical spectrum of interest, and then transmit the entire collected spectrum data to the user on the ground from each of thirty-five feed sets on the satellite, and then have the user beamform (establish a correct beam direction) from the collected spectrum data on the ground, and thereby detect a signal of interest. In the alternative, another known approach is to have the remote process on the satellite perform beamforming in space by using a command link that gives the satellite host (controllers) visibility to the beamformed latitude and longitude locations.

The problem with the first approach is that performing beamforming on the ground requires thirty-five times (based on the number of feeds needed) the communications bandwidth to collect the digital representation of the entire spectrum, and this approach only works in the receive mode. The problem with the second approach is that beamforming by using a command link that is visible to the satellite host does not provide the private security required by the remote users.

The classic problem of remote process control has been solved previously through the introduction of a trusted third party known as a certificate authority (CA) that vouches for the validity of the public keys of the participants. The public keys are used to establish private remote process control. In the satellite scenario, for example, the use of a certificate authority by a remote user is equivalent to sharing remote the user's control information with the satellite operators (operating as the certificate authority). This gives the operators the knowledge of the beamformed location, destroying the privacy between the remote user and the beamformer process on the satellite.

Accordingly, a solution is need that allows a remote user to privately control a remote shared process, wherein the user's commands to the remote shared process, and the results from the shared process to the user, are kept private from the host/controller of the shared process, and are known only by the remote user and the remote shared process.

SUMMARY OF THE INVENTION

The present invention solves the foregoing problems by establishing private control by a user host device of a shared remote process that executes in a remote device, in which the user host device sends to the remote process a request message including a user identifier, a remote process public key request, a user public key, and a current user session nonce, the remote process sends to the user host device a request response message including a process identifier, a process public key, and a nonce validation code, the user host device uses the received nonce validation code to validate the process public key, the user host device sends to the remote process a double-encrypted process command which is a process command encrypted with both a user private key and the process public key, and the remote process double-decrypts the process command using both a process private key and the user public key, and then executes the process command.

Specifically, according to one aspect of the invention, private control is established by a user host device of a shared remote process executing in a remote device, through a communication link between the user host device and the remote device via an intermediary communication device. The private control is established by sending, by the user host device, a request message to the remote process in the remote device, the request message including a user identifier corresponding to the user host device, a request for a remote process public key corresponding to the remote process, a user public key corresponding to the user host device, and a current user session nonce, and sending, by the remote process in response to receipt of the request message, a request response message to the user host device, the request response message including a process identifier corresponding to the remote process, a process public key corresponding to the remote process, and a nonce validation code based on the current user session nonce. The user host device compares, in response to receipt of the request response message, a calculated nonce validation value with the nonce validation code from the request response message, and then validates the process public key from the request response message in the case that the calculated nonce validation value and the nonce validation code are equivalent. The user host device sends, in the case that the process public key is validated, a double-encrypted process command to the remote process, the double-encrypted process command being a process command that has been encrypted with both a user private key corresponding to the user public key, and the process public key, and the remote process executes, in response to receipt of the double-encrypted process command, the process command by double-decrypting the double-encrypted process command using both a process private key corresponding to the process public key, and the user public key, and then executing the double-decrypted process command.

Preferably, the invention also includes sending responses from the remote process to the user host device, each response being generated by the remote process when executing a command sent from the user host device. Each response preferably has the remote process' copy of the current user session nonce appended to the end, and is then double-encrypted. The user host device decrypts the response and validates the response based on the current user session nonce that was appended to the end of the response. Preferably, the current user session nonce is a random number generated in the user host device. The user public and private keys are generated in the user host device before sending out the request message to the remote process. Also, when the session with the remote process is the first session by this specific user host device, or when a previous session with this specific user host device is being re-established, then the response from execution of the command is further validated by the user host device by comparing the response with a locally-verifiable expected response.

In this manner, the present invention provides for private control by a user host device of a shared remote process executing in a remote device, through a communication link between the user host device and the remote device via an intermediary communication device, thereby allowing the user host device to send commands to the shared remote process for execution without the intermediary communication device having knowledge of the commands. Accordingly, a trusted private control link is established between the user host device and the remote shared process in a secure fashion, whereby only the user host device and the remote process have knowledge of the commands sent to the remote process, and of the responses sent from the remote process to the user host device.

This brief summary has been provided so that the nature of the invention may be understood quickly. A more complete understanding of the invention can be obtained by reference to the following detailed description thereof in connection with the attached drawings.

DETAILED DESCRIPTION

As mentioned above, the present invention is generally directed to the establishment of private control by a user host device of a shared remote process executing in a remote device, through a communication link between the user host device and the remote device via an intermediary communication device, wherein the private control allows the user host device to send commands to the shared remote process without the intermediary communication device having knowledge of the commands.

Figure 1:
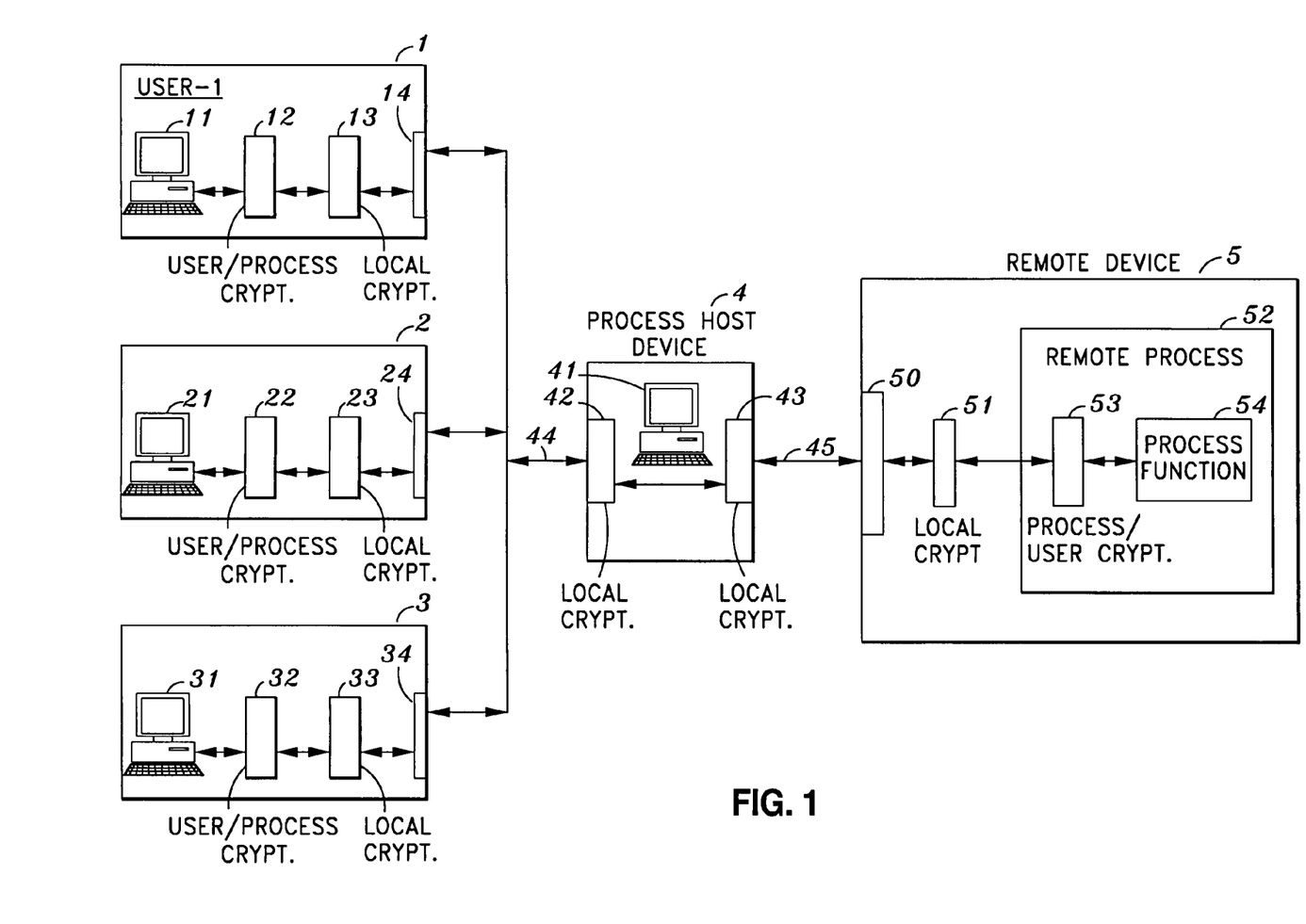
FIG. 1 is a block diagram depicting a general environment in which the present invention can be implemented according to a first embodiment of the invention.

Turning to the drawings, FIG. 1 shows an environment in which the method of the present invention can be implemented according to a first embodiment. Specifically, FIG. 1 shows user host devices 1, 2 and 3, process host device 4, and remote device 5. Each of users 1, 2 and 3 includes several components which are now described with respect to user 1, for the sake of brevity. User 1 includes host computer 11, user/process cryptography 12, local cryptography 13, and input/output port 14. Although shown separately for functional description, user/process cryptography 12 and local cryptography 13 are preferably performed in the processor of host computer 11, which is known type of host computer or workstation that includes input/output port 14. Accordingly, a user of user host device 1 can operate host computer 11 and communicate with other computing devices in a secure fashion using cryptography.

Process host device 4 represents a computing device that controls ("owns") access to, and communication with, remote device 5. As seen in FIG. 1, process host device includes process host computer 41, for managing such control and access, local cryptography 42 for providing secure communication link 44 with one or more of users 1, 2 and 3, and local cryptography 43 for providing secure communication link 45 with remote device 5. In this regard, it can be appreciated that, without implementation of secure process-level private control provided by the present invention, a user of process host computer 41 may have access to commands and communications sent between users 1, 2 and 3 and remote process 52, since such communications pass through process host device 4.

Remote device 5 is seen to include input/output port 50, local cryptography 51, and remote process 52. In this regard, remote device can be a computing device, or can be another type of device which has a processor and a memory for executing computer-executable process steps. Remote process 52 is seen to include process/user cryptography 53 and process function 54 which actually carries out the functionality of remote process 52. The local cryptography blocks (13, 23, 33, 42, 43 and 51) depicted in FIG. 1 actually use symmetric keys which may have been established or distributed using a public key and a private key corresponding to the device in which they are situated. By exchanging public keys between devices and exchanging a session key, secure communication links 44 and 45 are established.

Even though secure communication links 44 and 45 are established for communication between user 1 and remote device 5, the communications between user 1 and remote process 52 are non-private if user 1 does not use user/process cryptography 12, and only uses local cryptography 13, and if remote process 52 does not use process/user cryptography 53 of remote process 52, but only uses local cryptography 51. In such a scenario, a user of process host computer 41 can detect and see the nature of all communications between user 1 and remote device 5 because such communications pass through process host device 4 in an unencrypted manner when being transferred by process host device 4 from communication link 44 to communication link 45, and visa versa.

The present invention solves this problem through the use of user/process cryptography 12 by user 1, and process/user cryptography 53 by remote process 52, in addition to other trust establishing steps. In this regard, FIG. 2 provides a chronological depiction of the communications between user host device 1 and remote process 2 in order to first establish a trusted, secure and private communication path between user 1 and remote process 52, and then to facilitate the sending of commands from user 1 to remote process 52, the execution of such commands by remote process 52, and the return of command responses from remote process 52 to user 1.

Figure 2:
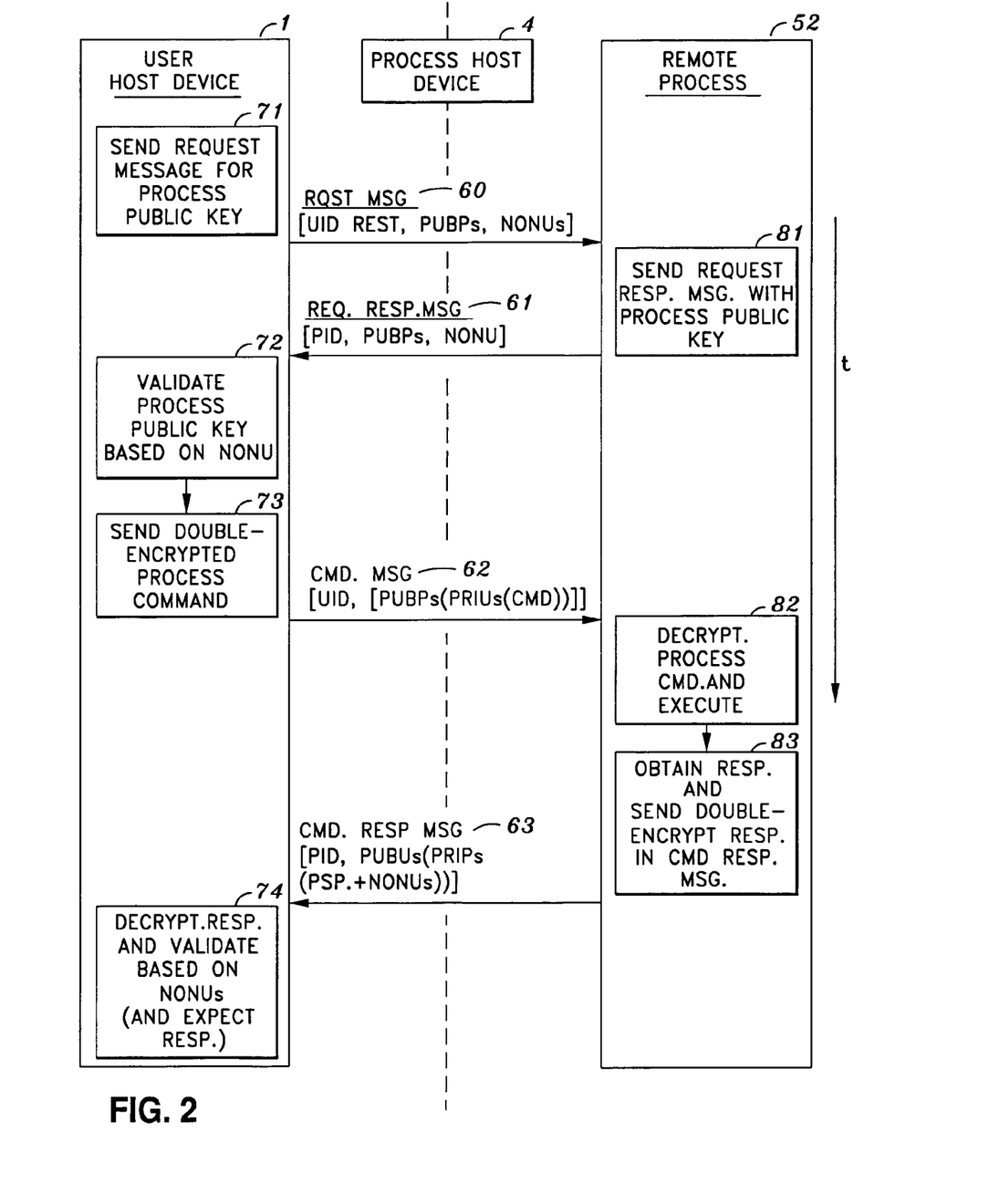
FIG. 2 is a schematic drawing depicting a chronological flow of communication between a user host device and a remote process according to a first embodiment of the invention.

As seen in FIG. 2, user host device 1, process host device 4, and remote process 52 are graphically depicted, along with the top-level communications between them in chronological (descending), according to the present invention. The invention assumes that an end-to-end communication link between user host device 1 and remote device 5 is already established using communication links 44 and 45 and local cryptography. First, in block 71, user host device 1 sends request message 60 to remote process 52, which includes a user identifier and a user public key corresponding to user host device 1, a request for a process public key corresponding to remote process 52, and a nonce which is a random number. Next, in block 81 of remote process 52, request response message 61 is sent to user host device 1, which includes a process identifier corresponding to remote process 52, a process public key corresponding to remote process 52, and a nonce validation code which is an exclusive/or (AND/OR) of the most previous session nonce for the user identifier with the nonce from the request message.

In block 72 of user host device 1, the received process public key is validated based on the received nonce validation code, and if the process public key is valid, a trusted, secure and private communication path is established for this session between user host device 1 and remote process 52. Next, in block 73, assuming that the process public key is validated, command message 62 is prepared based on a process command from a user of user host device 1 which is double-encrypted using the user private key and the process public key and then sent to remote process 52. In block 82, remote process 52 decrypts the process command using the process private key and the user public key, and then executes the command. In block 83, remote process 52 obtains a response from the executed command, appends the current nonce to the response, and double-encrypts the response using the process private key and the user public key. Remote process then sends command response message 63 to user host device 1, where command response message 63 includes the process identifier, and the double-encrypted response.

Lastly, as seen in block 74 of FIG. 2, user host device 1 decrypts the response and detaches the appended nonce. User host device 1 then validates the response based on the value of the detached nonce, and on a locally-verifiable expected response when this is the first session with remote process 52 by user host device 1, or when a previous session between remote process 52 by user host device 1 is being re-established. In this manner, user host device 1 can send commands to, and receive trusted responses from, remote process 52 without visibility of such commands and responses by a user of process host device 4.

Figure 3:
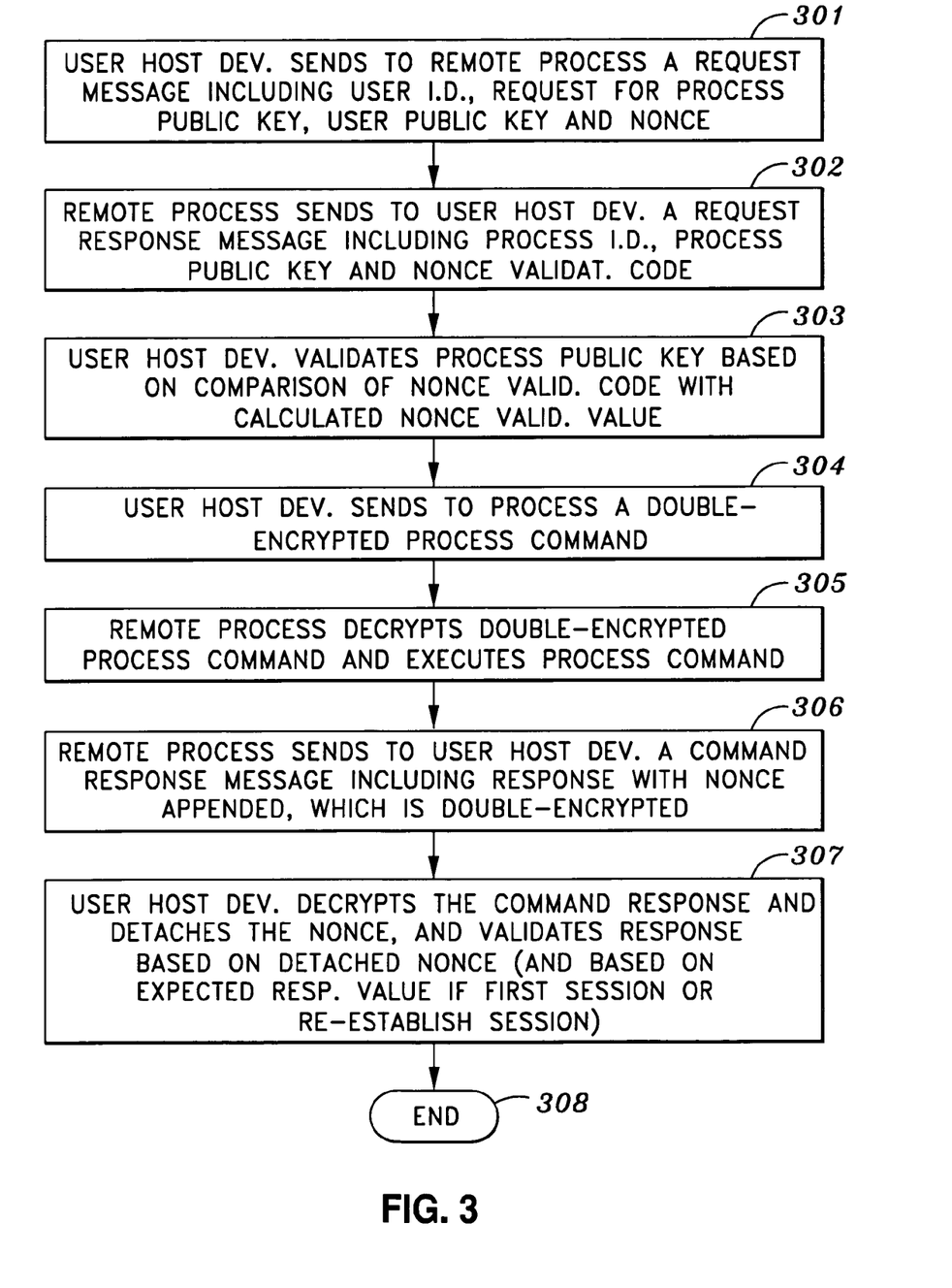
FIG. 3 is a flowchart for explaining the process steps for implementing the invention according to a first embodiment of the invention.

FIG. 3 is a flowchart for explaining in more detail the present invention. As seen in step 301 of FIG. 3, user host device 1 sends a request message to remote process 52, which includes a user identifier and a user public key corresponding to user host device 1, a request for a process public key corresponding to remote process 52, and a nonce which is a random number. The user public key is obtained in user host device 1 by an asymmetric key pair generator that generates a user public key and a corresponding user private key. Next, in step S302, remote process 52 sends a request response message to user host device 1, where the request response message includes a process identifier corresponding to remote process 52, a process public key corresponding to remote process 52, and a nonce validation code. The nonce validation code is an exclusive/or (AND/OR) of the locally-stored most previous session nonce corresponding to the user identifier with the current session nonce from the request message. In the case when remote process 52 does not have a locally-stored most previous session nonce corresponding to the user identifier, or the locally-stored most previous session nonce corresponding to the user identifier is equal to the current session nonce (the session is being re-established), the values for the locally-stored most previous session nonce is set to zero.

In step S303, user host device 1 validates the received process public key based on the received nonce validation code by comparing the received nonce validation code with a locally-calculated nonce validation value based on locally-stored values of the current session nonce and the previous session nonce. If the received nonce validation code and the locally-calculated nonce validation value match (are equivalent), the process public key is validated, thereby establishing a trusted, secure and private communication path for this session between user host device 1 and remote process 52. Next, in step S304, assuming that the process public key is validated in step S303, user host device prepares a command message based on a process command from a user of user host device 1, where the process command is double-encrypted using the user private key and the process public key and then sent to remote process 52. In step S305, remote process 52 double-decrypts the double-encrypted process command using the process private key and the user public key, and then executes the command. In step S306, remote process 52 obtains a response from the executed command, appends the current nonce to the response, double-encrypts the response using the process private key and the user public key, and sends a command response message to user host device 1 which includes the process identifier and the double-encrypted response.

Next, in step S307, user host device 1 double-decrypts the response and detaches the appended nonce from the response. User host device 1 then validates the response based on the value of the detached nonce compared to the value of the locally-stored nonce. In the case that user host device 1 does not have a locally-stored most previous session nonce corresponding to remote process 52, or the locally-stored most previous session nonce corresponding to remote process 52 is equal to the current session nonce (the session is being re-established), then the validation of the response is also based on a locally-verifiable expected response. Process flow then passes to end in step S308. In this manner, user host device 1 can send commands to, and receive responses from, remote process 52 without visibility of such commands and responses by a user of process host device 4. Also, the private communication path between user host device 1 and remote process 52 is trusted because user host device 1 checks the first response after execution of a command, to make sure the response matches an expected response.

Figure 4:
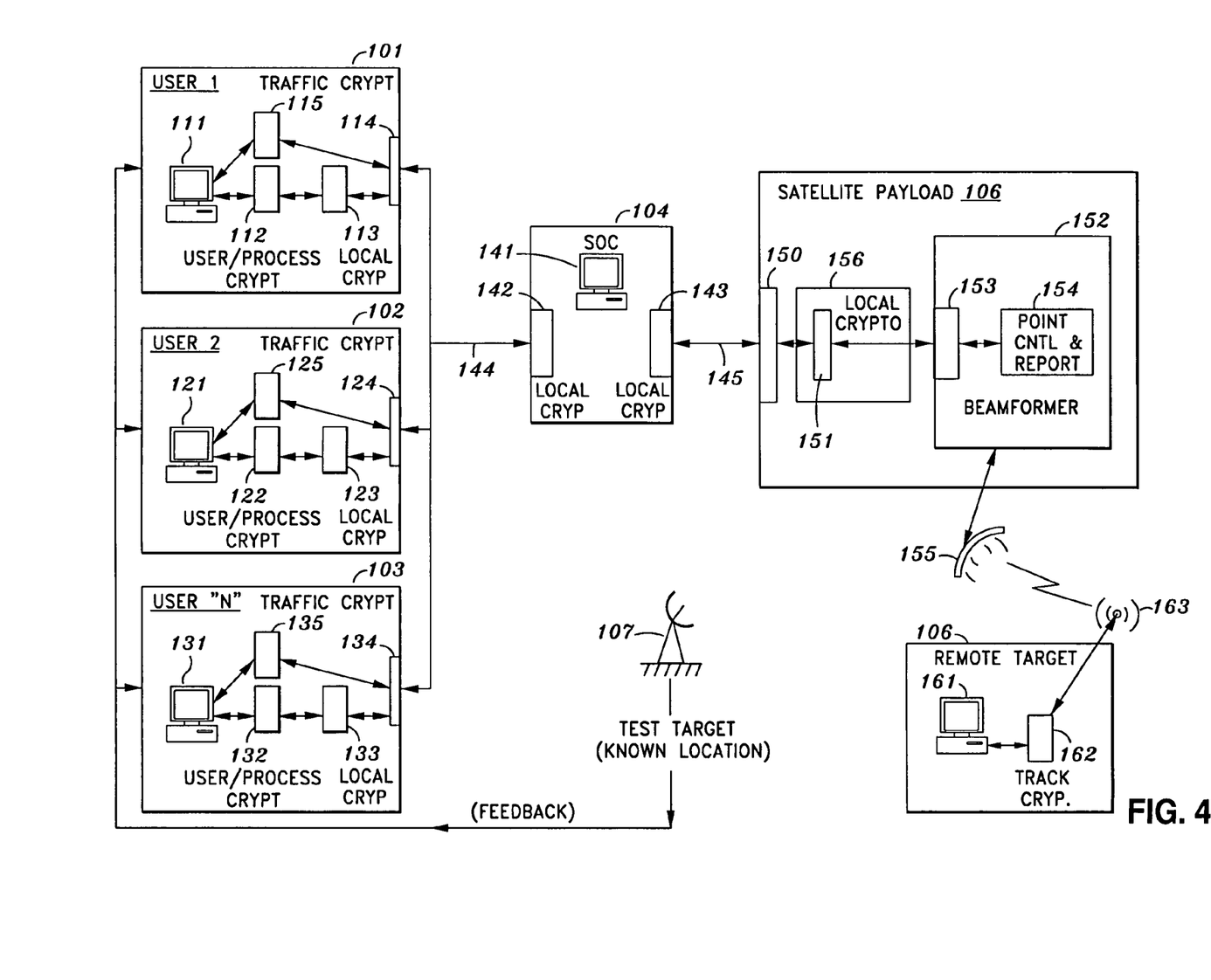
FIG. 4 is a block diagram depicting a satellite environment in which the present invention can be implemented according to a second embodiment of the invention.

FIG. 4 depicts an environment according to a specific embodiment of the invention for remote private satellite control by a user. As seen in FIG. 4, shown are user host devices 101, 102 and 103, satellite process host device 104, satellite payload 105, remote target 163, and test target 107. Each of users 101, 102 and 103 includes several components which are now described with respect to user 101, for the sake of brevity. User 101 includes host computer 111, user/process cryptography 112, local cryptography 113, input/output port 114, and traffic cryptography 115. Although shown separately for functional description, user/process cryptography 112, local cryptography 113, and traffic cryptography 115 are preferably performed in the processor of host computer 111, which is known type of host computer or workstation that includes input/output port 114. Accordingly, a user of user host device 101 can operate host computer 111 and communicate with other computing devices in a secure fashion using cryptography.

Satellite process host device 104 represents a computing device that controls ("owns") access to, and communication with, satellite payload 105. As seen in FIG. 4, satellite process host device 104 includes process host computer 141, for managing such control and access to satellite payload 105, local cryptography 142 for providing secure communication link 144 with one or more of users 101, 102 and 103, and local cryptography 143 for providing secure communication link 145 with satellite payload 105. In this regard, it can be appreciated that, without implementation of secure process-level private control provided by the present invention, a user of process host computer 141 may have access to commands and communications sent between users 101, 102 and 103 and beamformer process 152, since such communications pass through satellite process host device 104.

Satellite payload 105 is seen to include input/output port 150, payload controller 156 that includes local cryptography 151, and beamformer process 152. Also included is antenna 155 for forming a directed communication beam, which is preferably a narrow communication beam. In this regard, satellite payload 105 includes which a processor and a memory (not shown) for executing computer-executable process steps that include beamformer process 152 and also the steps to implement the present invention. Beamformer process 152 is seen to include process/user cryptography 153 and pointing control and reporting function 154 which actually carries out the functionality of beamformer process 152. Remote target 106 is a computer processing device, which is preferably mobile, that has antenna 163 for transmitting a communication signal to antenna 155 of satellite payload 105.

The local cryptography blocks (113, 123, 133, 142, 143 and 151) depicted in FIG. 4 actually use symmetric keys which may have been established or distributed using a public key and a private key corresponding to the device in which they are situated. By exchanging public keys between devices and exchanging a session key, secure communication links 144 and 145 are established. Traffic cryptography blocks 115, 125, 135 and 162 allow encrypted traffic to be exchanged between user host device 1 and remote target 106, without the traffic contents being visible to any of the other devices, including satellite payload 105 and beamformer process 152. Preferably, each of the traffic cryptography blocks represents a single symmetric key, which has been previously entrusted to the device which holds it. Test target 107 is used by user host device 101 to obtain trust that it has a private secure connection with a trusted process.

According to FIG. 4, user host device 1 can establish a private and secure communication path with beamformer process 152 in satellite payload 105, and then direct beamformer process 152 to form the communication beam onto remote target 106, wherein a user of satellite process host device 104 cannot have visibility into the communications on the private secure path, even though such communications pass through satellite process host device 104. Once beamformer process 152 has directed the communication beam onto remote target 106, user host device 1 can establish secure communications directly with remote target 106 through the use of the symmetric key of traffic cryptography 115 in user 1, and the same symmetric key of traffic cryptography 162 in remote target 106.

Figure 5:
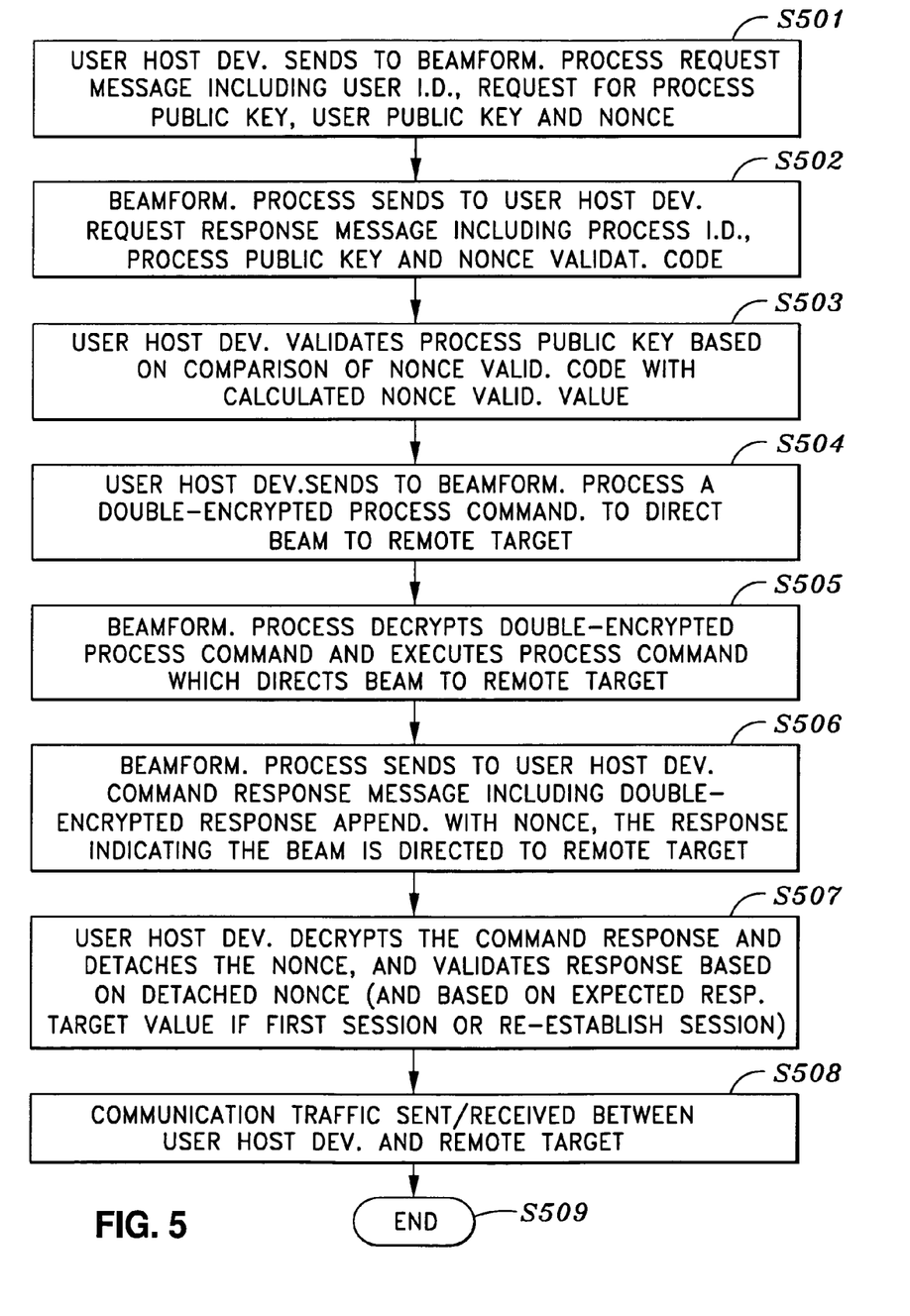
FIG. 5 is a flowchart for explaining the process steps for implementing the invention according to a second embodiment of the invention.

FIG. 5 is a flowchart for explaining in more detail the present embodiment of the invention depicted in FIG. 4. As seen in step 501 of FIG. 3, user host device 101 sends a request message to beamformer process 152, which includes a user identifier and a user public key corresponding to user host device 101, a request for a process public key, and a nonce which is a random number. The user public key is obtained in user host device 101 by an asymmetric key pair generator that generates a user public key and a corresponding user private key. Next, in step S502, beamformer process 152 sends a request response message to user host device 101, where the request response message includes a process identifier and a process public key which correspond to beamformer process 152 and a nonce validation code. The process public key is obtained by executing an asymmetric key pair generator in beamformer process 152 which generates the process public key and a corresponding process private key. The nonce validation code is an exclusive/or (AND/OR) of the locally-stored previous session nonce corresponding to the user identifier with the current session nonce from the request message. When beamformer process 152 does not have a locally-stored most previous session nonce corresponding to the user identifier, or the locally-stored previous session nonce is equal to the current session nonce (the session is being re-established), the value for the locally-stored most previous session nonce is set to zero.

In step S503, user host device 101 validates the received process public key based on the received nonce validation code by comparing the received nonce validation code with a locally-calculated nonce validation value based on locally-stored values of the current session nonce and the previous session nonce. If the received nonce validation code and the locally-calculated nonce validation value match (are equivalent), the process public key is validated, thereby establishing a trusted, secure and private communication path for this session between user host device 101 and beamformer process 152. Next, in step S504, assuming that the process public key is validated in step S503, user host device 101 prepares a command message based on a process command from a user of user host device 101, where the process command is double-encrypted using the user private key and the process public key and then sent to beamformer process 152. In step S505, beamformer process 152 double-decrypts the double-encrypted process command using the process private key and the user public key, and then executes the command. In step S506, beamformer process 152 obtains a response from the executed command, appends the current nonce to the response, double-encrypts the response using the process private key and the user public key, and sends a command response message to user host device 101, wherein the command response message includes the process identifier and the double-encrypted response.

Next, in step S507, user host device 101 double-decrypts the response and detaches the appended nonce from the response. User host device 101 then validates the response based on the value of the detached nonce compared to the value of the locally-stored nonce. In the case that user host device 101 does not have a locally-stored most previous session nonce corresponding to beamformer process 152, or the locally-stored most previous session nonce corresponding to beamformer process 152 is equal to the current session nonce (the session is being re-established), then the validation of the response is also based on a locally-verifiable expected response. For example, if the response contains the position data of the communication beam, user host device 101 can compare the received position data to the known position data of test target 107, which is where user host device 101 commanded beamformer process 152 to direct the beam. If the data matches, the response is validated.

In step S508, if the response was validated in step S507, user host device 101 securely communicates with remote target 106 using the symmetric traffic key of traffic cryptography 115. The process then ends at step S509. In this manner, user host device 101 sends commands to, and receives responses from, beamformer process 152 without visibility of such commands and responses by a user of satellite process host device 104. Also, the private communication path between user host device 101 and beamformer process 152 is trusted because user host device 101 checks the first response after execution of a test command to confirm that it matches a known response. Of course, other types of uses of beamformer process 152 can be commanded by user host device 101, such as establishing a secure private communication path with other systems having a higher security level than that of the satellite payload.

Accordingly, the arrangement of the present invention results in the private control by a user host device of a shared remote process executing in a remote device, through a communication link between the user host device and the remote device via an intermediary communication device, thereby allowing the user host device to send commands to the shared remote process for execution without the intermediary communication device having knowledge of the commands. Accordingly, a trusted private control link is established between the user host device and the remote shared process in a secure fashion, whereby only the user host device and the remote process have knowledge of the commands sent to the remote process, and of the responses sent from the remote process to the user host device.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for establishing private control by a user host device of a shared remote process executing in a remote device, through a communication link between the user host device and the remote device via an intermediary communication device, the method comprising:

a remote process key request step of sending, by the user host device, a request message to the remote process in the remote device, the request message including a user identifier corresponding to the user host device, a request for a remote process public key corresponding to the remote process, a user public key corresponding to the user host device, and a current user session nonce;

a request response step of sending, by the remote process in response to receipt of the request message, a request response message to the user host device, the request response message including a process identifier corresponding to the remote process, a process public key corresponding to the remote process, and a nonce validation code based on the current user session nonce;

a remote process key validation step of comparing, in the user host device in response to receipt of the request response message, a calculated nonce validation value and the nonce validation code from the request response message, and then validating the process public key from the request response message in the case that the calculated nonce validation value and the nonce validation code are equivalent;

a command step of sending, by the user host device in the case that the process public key is validated, a double-encrypted process command to the remote process, the double-encrypted process command being a process command that has been encrypted with both a user private key corresponding to the user public key, and the process public key; and a command execution step of executing, in the remote process in response to receipt of the double-encrypted process command, the process command by double-decrypting the double-encrypted process command using both a process private key corresponding to the process public key, and the user public key, and then executing the double-decrypted process command.

2. A method according to claim 1, further comprising the steps of:
a command response step of sending, by the remote process, a command response message to the user host device, the command response message including a command response returned from execution of the process command by the remote process, the command response having the current user session nonce appended thereto and being double-encrypted using both the process private key and the user public key; and
a command response validation step of validating, in the user host device in response to receipt of the command response message, the command response by double-decrypting the double-encrypted command response using both the process public key and the user private key, detaching the current user session nonce from the end of the decrypted command response, comparing the detached current user session nonce value to a locally-stored value of the current user session nonce, and validating the command response in the case that the detached current user session nonce value and the locally-stored current user session nonce value have equivalent values.

3. A method according to claim 2, wherein, in the command response validation step, in the case that the user host device does not have a locally-stored previous user session nonce, or in the case that the user host device has a locally-stored previous user session nonce that has a same value as that of the current user session nonce, the command response is compared to a locally-verifiable expected response, and the command response is only validated if the detached current user session nonce value and the locally-stored current user session nonce value have equivalent values, and if the command response is equivalent to the locally-verifiable expected response.

4. A method according to claim 1, wherein, in the remote process key request step, the user public key is obtained by executing, in the user host device, a key pair generator which generates an asymmetric user key pair that includes the user public key and the corresponding user private key, and the current user session nonce is a random number which is obtained by executing, in the user host device, a random number generator.

5. A method according to claim 1, wherein, in the request response step, the process public key is obtained by executing, in the remote process, a key pair generator which generates an asymmetric process key pair that includes the process public key and the corresponding process private key, and the nonce validation code is obtained by performing an exclusive-or (AND/OR) algorithm in the remote process on a locally-stored previous user session nonce corresponding to the user identifier and on the current user session nonce from the request message.

6. A method according to claim 5, wherein, in the case that a stored previous user session nonce does not exist, or in the case that the previous user session nonce is the same as the current user session nonce from the request message, the value of the previous user session nonce is set to zero.

7. A method according to claim 5, wherein, in the remote process key validation step, the calculated nonce validation value is obtained by performing an exclusive-or (AND/OR) algorithm in the user host device on a locally-stored previous user session nonce corresponding to the user identifier and on the current user session nonce.

8. A method according to claim 1, wherein, in the case that the process public key from the request response message is not validated in the remote process key validation step, the remote process key request step is re-executed.

9. A method according to claim 1, wherein, in the command step, the process command is input into the user host device by a user through an input device.

10. A method according to claim 1, wherein the remote device is a processing device on a satellite, the shared remote process is a communication beam-pointing process, and the intermediary communication device is a satellite operation center, and wherein the communication link between the user host device and the satellite processing device includes a first communication link between the user host device and the satellite operation center, and a second communication link between the satellite operation center and the satellite processing device.

11. A method according to claim 10, wherein the first communication link is secured through the use of two sets of asymmetric key pairs which correspond to the user host device and the satellite operation center, respectively, and wherein the second communication link is secured through the use of two sets of asymmetric key pairs which correspond to the satellite operation center and the satellite processing device, respectively.

12. A system for establishing private control of a shared remote process, the system comprising:
user host device;
a remote device in which the shared remote process executes;
an intermediary communication device through which a communication link is established between the user host device and the remote device;
remote process key request means in the user host device for sending a request message to the remote process in the remote host device, the request message including a user identifier corresponding to the user host device, a request for a remote process public key corresponding to the remote process, a user public key corresponding to the user host device, and a current user session nonce;
request response means in the remote process for sending, in response to receipt of the request message, a request response message to the user host device, the request response message including a process identifier corresponding to the remote process, a process public key corresponding to the remote process, and a nonce validation code based on the current user session nonce;
remote process key validation means in the user host device for comparing, in response to receipt of the request response message, a calculated nonce validation value and the nonce validation code from the request response message, and then validating the process public key from the request response message in the case that the calculated nonce validation value and the nonce validation code are equivalent;
command means in the user host device for sending, in the case that the process public key is validated, a double-encrypted process command to the remote process, the double-encrypted process command being a process command that has been encrypted with both a user private key corresponding to the user public key, and the process public key; and
command execution means in the remote process for executing, in response to receipt of the double-encrypted process command, the process command by double-decrypting the double-encrypted process command using both a process private key corresponding to the process public key, and the user public key, and then executing the double-decrypted process command.

13. A system according to claim 12, further comprising:

command response means in the remote process for sending a command response message to the user host device, the command response message including a command response returned from execution of the process command by the remote process, the command response having the current user session nonce appended thereto and being double-encrypted using both the process private key and the user public key; and command response validation means in the user host device for validating, in response to receipt of the command response message, the command response by double-decrypting the double-encrypted command response using both the process public key and the user private key, detaching the current user session nonce from the end of the decrypted command response, comparing the detached current user session nonce value to a locally-stored value of the current user session nonce, and validating the command response in the case that the detached current user session nonce value and the locally-stored current user session nonce value have equivalent values.

14. A system according to claim 13, wherein, in the case that the user host device does not have a locally-stored previous user session nonce, or in the case that the user host device has a locally-stored previous user session nonce that has a same value as that of the current user session nonce, the command response validation means performs a comparison of the command response to a locally-verifiable expected response, and only validates the command response if the detached current user session nonce value and the locally-stored current user session nonce value have equivalent values, and if the command response is equivalent to the locally-verifiable expected response.

15. A system according to claim 12, wherein the remote process key request means obtains the user public key by executing, in the user host device, a key pair generator which generates an asymmetric user key pair that includes the user public key and the corresponding user private key, and obtains the current user session nonce by executing, in the user host device, a random number generator to obtain a random number which is assigned to the current user session nonce.

16. A system according to claim 12, wherein the request response means obtains the process public key by executing, in the remote process, a key pair generator which generates an asymmetric process key pair that includes the process public key and the corresponding process private key, and obtains the nonce validation code by performing an exclusive-or (AND/OR) algorithm in the remote process on a locally-stored previous user session nonce corresponding to the user identifier and on the current user session nonce from the request message.

17. A system according to claim 16, wherein, in the case that a locally-stored previous user session nonce does not exist, or in the case that the locally-stored previous user session nonce is the same as the current user session nonce from the request message, the value of the previous user session nonce is set to zero.

18. A system according to claim 16, wherein the remote process key validation means obtains the calculated nonce validation value by performing an exclusive-or (AND/OR) algorithm in the user host device on a locally-stored previous user session nonce corresponding to the user identifier and on the current user session nonce.

19. A system according to claim 12, wherein, in the case that the process public key from the request response message is not validated by the remote process key validation means, the remote process key request step is re-executed.

20. A system according to claim 12, wherein the command means obtains the process command from a user through an input device connected to the user host device.

21. A system according to claim 12, wherein the remote device is a processing device on a satellite, the shared remote process is a communication beam-pointing process, and the intermediary communication device is a satellite operation center, and wherein the communication link between the user host device and the satellite processing device includes a first communication link between the user host device and the satellite operation center, and a second communication link between the satellite operation center and the satellite processing device.

22. A system according to claim 21, wherein the first communication link is secured through the use of two sets of asymmetric key pairs which correspond to the user host device and the satellite operation center, respectively, and wherein the second communication link is secured through the use of two sets of asymmetric key pairs which correspond to the satellite operation center and the satellite processing device, respectively.

23. A method for use in a user host device to establish private control of a shared remote process executing in a remote device, through a communication link between the user host device and the remote device via an intermediary communication device, the method comprising:

a remote process key request step of sending a request message to the remote process in the remote device, the request message including a user identifier corresponding to the user host device, a request for a remote process public key corresponding to the remote process, a user public key corresponding to the user host device, and a current user session nonce;

a request response receiving step of receiving, from the remote process in response to receipt of the request message, a request response message that includes a process identifier corresponding to the remote process, a process public key corresponding to the remote process, and a nonce validation code based on the current user session nonce;

a remote process key validation step of comparing a calculated nonce validation value and the nonce validation code from the received request response message, and then validating the process public key from the request response message in the case that the calculated nonce validation value and the nonce validation code are equivalent;

a command step of sending, in the case that the process public key is validated by remote process key validation step, a double-encrypted process command to the remote process, the double-encrypted process command being a process command that has been encrypted with both a user private key corresponding to the user public key, and the process public key;

a command response receiving step of receiving, from the remote process, a command response message that includes a command response returned from execution of the process command by the remote process, the command response having the current user session nonce appended thereto and being double-encrypted using both the process private key and the user public key; and a command response validation step of validating the received command response by double-decrypting the double-encrypted command response using both the process public key and the user private key, detaching the current user session nonce from the end of the decrypted command response, comparing the detached current user session nonce value to a locally-stored value of the current user session nonce, and validating the command response in the case that the detached current user session nonce value and the locally-stored current user session nonce value have equivalent values.

24. A user host device which establishes private control of a shared remote process executing in a remote device, through a communication link between the user host device and the remote device via an intermediary communication device, the user host device comprising:

a processor for executing computer-executable process steps; and a memory storing computer-executable process steps for execution by the processor, the computer-executable process steps including:

a remote process key request step of sending a request message to the remote process in the remote device, the request message including a user identifier corresponding to the user host device, a request for a remote process public key corresponding to the remote process, a user public key corresponding to the user host device, and a current user session nonce;

a request response receiving step of receiving, from the remote process in response to receipt of the request message, a request response message, the request response message including a process identifier corresponding to the remote process, a process public key corresponding to the remote process, and a nonce validation code based on the current user session nonce;

a remote process key validation step of comparing a calculated nonce validation value and the nonce validation code from the received request response message, and then validating the process public key from the request response message in the case that the calculated nonce validation value and the nonce validation code are equivalent;

a command step of sending, in the case that the process public key is validated by remote process key validation step, a double-encrypted process command to the remote process, the double-encrypted process command being a process command that has been encrypted with both a user private key corresponding to the user public key, and the process public key;

a command response receiving step of receiving, from the remote process, a command response message that includes a command response returned from execution of the process command by the remote process, the command response having the current user session nonce appended thereto and being double-encrypted using both the process private key and the user public key; and a command response validation step of validating the received command response by double-decrypting the double-encrypted command response using both the process public key and the user private key, detaching the current user session nonce from the end of the decrypted command response, comparing the detached current user session nonce value to a locally-stored value of the current user session nonce, and validating the command response in the case that the detached current user session nonce value and the locally-stored current user session nonce value have equivalent values.

25. A method for use in a remote device to establish private control by a user host device of a shared remote process executing in the remote device, through a communication link between the user host device and the remote device via an intermediary communication device, the method comprising:

a remote process key request receiving step of receiving in the remote process, from the user host device, a request message that includes a user identifier corresponding to the user host device, a request for a remote process public key corresponding to the remote process, a user public key corresponding to the user host device, and a current user session nonce;

a request response step of sending a request response message from the remote process to the user host device, the request response message including a process identifier corresponding to the remote process, a process public key corresponding to the remote process, and a nonce validation code based on the current user session nonce;

a command receiving step of receiving in the remote process, from the user host device in the case that the process public key is validated, a double-encrypted process command to the remote process, the double-encrypted process command being a process command that has been encrypted in the remote process with both a user private key corresponding to the user public key, and the process public key;

a command execution step of executing the double-encrypted process command by double-decrypting the double-encrypted process command using both a process private key corresponding to the process public key, and the user public key, and then executing the double-decrypted process command; and a command response step of sending a command response message to the user host device, the command response message including a command response returned from execution of the process command, the command response having the current user session nonce appended thereto and being double-encrypted using both the process private key and the user public key.

26. A remote device that provides private control by a user host device of a shared remote process executing in the remote device, through a communication link between the user host device and the remote device via an intermediary communication device, the remote device comprising:

a processor for executing computer-executable process steps; and a memory storing computer-executable process steps for execution by the processor, the computer-executable process steps including:

a set of shared remote process steps;

a remote process key request receiving step of receiving in the remote process, from the user host device, a request message that includes a user identifier corresponding to the user host device, a request for a remote process public key corresponding to the remote process, a user public key corresponding to the user host device, and a current user session nonce;

a request response step of sending a request response message from the remote process to the user host device, the request response message including a process identifier corresponding to the remote process, a process public key corresponding to the remote process, and a nonce validation code based on the current user session nonce;

a command receiving step of receiving in the remote process, from the user host device in the case that the process public key is validated, a double-encrypted process command to the remote process, the double-encrypted process command being a process command that has been encrypted in the remote process with both a user private key corresponding to the user public key, and the process public key;

a command execution step of executing the double-encrypted process command by double-decrypting the double-encrypted process command using both a process private key corresponding to the process public key, and the user public key, and then executing the double-decrypted process command; and a command response step of sending a command response message to the user host device, the command response message including a command response returned from execution of the process command, the command response having the current user session nonce appended thereto and being double-encrypted using both the process private key and the user public key.

* * * * *